United States Patent Office 2,963,382
Patented Dec. 6, 1960

2,963,382
ELASTIC COMPOSITIONS AND METHOD OF APPLYING SAME

Joseph L. Switzer, Gates Mills, Ohio, assignor, by direct and mesne assignments, to Switzer Brothers, Inc., Cleveland, Ohio, a corporation of Ohio No Drawing. Filed Dec. 23, 1957, Ser. No. 704,254

15 Claims. (Cl. 117—33.5)

This invention relates to the discovery of new vulcanizable synthetic rubber compositions, the art of curing them, and the resulting cured compositions. These compositions have been found to be particularly useful as coatings and coating compositions, particularly daylight fluorescent coatings and coating compositions, though neither the compositions nor their utility are so limited.

More precisely, and in detail, I have discovered daylight fluorescent coating compositions which will promote the heretofore highly desirable but unobtainable properties of very high initial daylight fluorescent brightness, flexibility, adhesion to flexed supporting surfaces and resistance to abrasion, all maintained while exposed to prolonged and severe fading and weathering conditions (as encountered by tarpaulins and canopies of life rafts, for example).

In achieving these particular and specific objectives, I also have discovered that the new synthetic rubber compositions and the art of curing them are useful not only in combination with daylight fluorescent pigments for flexible and elastic coatings subjected to severe abrasion, flexing and weathering conditions, but as vehicles in non-fluorescent coating and impregnating compositions, as film and sheets (supported or unsupported) and molded or extruded synthetic rubber products.

As stated above, daylight fluorescent coating compositions could not be obtained which possessed the desirable properties of flexibility, adhesion to flexed supporting surfaces, resistance to abrasion, and high initial daylight fluorescent brightness under prolonged and severe fading and weathering conditions. Various attempts have been made to combine rubber compounds with the daylight fluorescent pigments to achieve these properties; however, the selection of a suitable rubber compound has been complicated by the fact that the usual sulfur or sulfur-containing rubber curing agents and the prolonged cure at relatively high temperatures greatly diminish or completely destroy the daylight fluorescent properties of the pigments. In addition, conventional non-sulfurous curing agents, for example, the peroxides, also have a deleterious effect upon the fluorescent pigments. The problem is further complicated by the fact that some of the rubber compounds require solvents which also dissolve the pigments, whereas, to be effective, the pigment should remain as dispersed particles.

Attempts have been made to use a chlorosulfonated polyethylene synthetic rubber prepared by the simultaneous chlorination and chlorosulfonation of polyethylene. The curing agents heretofore employed for curing chlorosulfonated polyethylene were mixtures of an organic acid, a complex sulfur-containing rubber type accelerator and a polybasic metal oxide or a polybasic salt of a weak acid and required extended time and/or elevated temperatures to effect curing. Thus, when a specially recommended mixture, such as, for example, hydrogenated wood rosin, dipentamethylenethiuramtetrasulfide and magnesium oxide, is used with chlorosulfonated polyethylene in a coating composition, three or four days are required to cure the coating in air at room temperature. To reduce the curing time to a reasonable period, it is necessary to employ such high temperatures that there will be a breakdown of the chlorosulfonated polyethylene, e.g., above about 165–170° C. Moreover, coatings made from compositions containing the fluorescent pigment, chlorosulfonated polyethylene and the above curing agent mixture are completely unsatisfactory in that the brightness of the fluorescent pigment is greatly diminished due to masking by the magnesium oxide pigment, the abrasion resistance is very low, and the rate of curing is extremely slow.

In view of the previous failures in attempts to use rubber compounds to improve daylight fluorescent coatings, it was totally unexpected and completely surprising to find that daylight fluorescent coating compositions could be prepared which had the previously desirable but unobtainable properties of high initial and prolonged daylight fluorescent brightness, flexibility, adhesion to flexed supporting surfaces and very high abrasion resistance even under prolonged and severe fading and weathering conditions. These coating compositions are prepared in accordance with the present invention by a method in which hexamethylenetetramine is dispersed in the chlorosulfonated polyethylene; the hexamethylenetetramine, as a single component, can apparently perform all the curing functions of the three-component curing mixtures heretofore employed, although the mechanics by which such functions are performed by the hexamethylenetetramine is not apparent or fully understood.

The coating compositions of the present invention not only produce coatings which possess the previously unattainable combination of properties set forth above but the method for preparing the coating compositions according to the present invention also overcomes the process difficulties encountered heretofore. For example, the solvents for the chlorosulfonated polyethylene (if employed to aid dispersion of the hexamethylenetetramine) do not dissolve the daylight fluorescent pigments nor does the hexamethylenetetramine curing agent destroy or mask the brightness of the pigments. Furthermore, the rate of curing is only about one-third the time required with the recommended three-component curing agent set forth above. Thus, in applications where relatively short curing periods are needed or desirable, e.g., about five minutes, a safe curing temperature of only about 150° C. is satisfactory, in contrast to the much higher temperatures necessary with the conventional curing agent which cause a breakdown of the chlorosulfonated polyethylene.

Chlorosulfonated polyethylene, as stated above, is prepared by the simultaneous chlorination and chlorosulfonation of polyethylene. This is accomplished by reaction of the polyethylene in solution with gaseous chlorine and sulfur dioxide. When the reaction is complete, the polyethylene contains approximately 1.25% sulfur as sulfonyl chloride and approximately 27% chlorine. The specific gravity of the finished polymer is about 1.10. The structural formula of chlorosulfonated polyethylene is represented as follows:

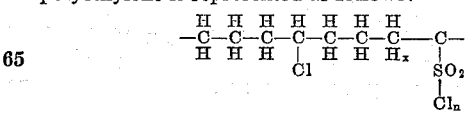

where "$n$" is approximately 12 and "$x$" is approximately 17. A commercial product having an average molecular weight of about 20,000 is available from E. I. du Pont de Nemours and Company under the name "Hypalon 20."

The chlorosulfonated polyethylene becomes a vulcanizable composition when hexamethylenetetramine is dispersed therein, by the use of solvents for the chlorosulfonated polyethylene, dispersants, or even mechanical mixtures with milling (provided the effect of heat generated in the course of such mechanical dispersion is taken into account).

The curing of the vulcanizable compositions of the present invention can be accomplished with or without the use of heat. Satisfactory air curing of the coatings has been achieved by overnight air-drying. Where heat is employed, temperatures up to about 150° C. provide relatively short curing periods. For example, coatings can be cured by heating at 110° C. for about 20 minutes or for only about five minutes at 150° C. The rate of curing will depend upon a number of factors, for example, the molecular weight of the polymer, the solvents employed, the thickness of the coating, the material being coated, etc. However, in all cases, the employment of the hexamethylenetetramine-containing coating compositions results in curing times which are much less than the time required by the three-component curing agents heretofore employed.

Since the hexamethylenetetramine-containing coating compositions may have a rate of curing three times faster than compositions using the curing agents of the prior art, the present invention opens completely new fields for chlorosulfonated polyethylene, among them being paints and other coating materials. Advantageously, the coating compositions prepared according to the present invention contain a pigment dispersed therein. Any of the conventional well known pigments, e.g., titanium dioxide, etc., may be employed providing they do not have a deleterious effect upon the chlorosulfonated polyethylene or the curing thereof. Especially advantageous for use in coating compositions for coated fabrics such as life raft canopies and tarpaulins, are the daylight fluorescent pigments which heretofore as stated above have not been successfully incorporated in synthetic rubber coatings.

In the preparation of daylight fluorescent coating compositions employing the chlorosulfonated polyethylene and the hexamethylenetetramine, particularly useful are daylight fluorescent pigments of the types described in U.S. Patents Nos. 2,498,592 and 2,809,954 in which daylight fluorescent dyestuffs such as the rhodamines, naphthalimides, xanthenes, etc., are combined with certain thermosetting and thermoplastic resins. Among the thermosetting type pigments described in 2,498,592 are pigments prepared by combining daylight fluorescent dyestuffs with thermosetting resins such as modified and unmodified ureaformaldehyde resins, melamine resins, silicone resins, pentaerythritol resins and mixtures of such resins. Suitable thermoplastic pigments described in 2,809,954 are combinations of daylight fluorescent dyestuffs with copolymers of a melamine, aromatic sulfonamide and an aldehyde such as formaldehyde.

When using daylight fluorescent pigment coating compositions, maximum brilliance may be achieved if a double coat is applied. The first coat is a white coat in which a pigment such as titanium dioxide is employed with the second coat containing the daylight fluorescent pigment. Preferably, the coating compositions for both coats are the same with the exception of the pigment therein, that is, both compositions contain chlorosulfonated polyethylene in combination with hexamethylenetetramine.

The present invention will be described in greater detail in the following examples although the invention is not intended to be limited by such examples.

*Example 1*

A daylight fluorescent pigment was prepared by the following procedure:

360 grams of mixed o- and p-toluene sulfonamide-formaldehyde resins were melted at 60°–70° C. and then heated to 125° C. At this temperature 78.4 grams of B-stage unmodified melamine-formaldehyde resin were added and dissolved therein. The solution became clear at about 150° C. Heating was continued up to about 170° C. and held there for about 10 minutes. During this period, 1.37 grams of rhodamine B Extra, 2.07 grams of rhodamine 6 GDN Extra and 4.12 grams of Brilliant Yellow 6G Base were added. Upon cooling, the co-condensed resin pigment began to solidify at about 115° C. The product (94.5% yield) was fiery-orange in color which below about 100° C. became brittle, friable and easily ground in a micropulverizer or by wet ball milling into a finely divided powdered pigment.

Coated fabrics, suitable for use as tarpaulins and life raft canopies, were prepared by mixing 80 grams of a 40% solution in xylol of chlorosulfonated polyethylene having an average molecular weight of about 20,000 (Hypalon 20), 18 grams of titanium dioxide and 5.76 grams of a 33.3% solution of hexamethylenetetramine in xylol. The resulting mixture was given one pass on a 3-roll mill to insure uniformity. The coating composition formed was applied to a nylon fabric with a floating knife bar and the coated fabric cured in an oven for about 20 minutes at 110° C. After curing, the coated fabric was given a second coat with a mixture similar to the first coating composition but containing 24 grams of the above daylight fluorescent pigment in place of the 18 grams of titanium dioxide. After the second coat, the fabric was again cured for 20 minutes at 110° C. The fabric was a brilliant, daylight fluorescent, fiery-orange color and had good flexibility without any peeling or cracking of the coating. Samples exposed to prolonged and severe weathering and fading conditions did not show any significant change in appearance or properties.

To test the abrasion resistance of the double-coated, cured fabric, a sample was subjected to the standard abrasion test of Federal Specification CCC–T–191, Methods 5304 and 5512. The fabric was abraded according to Method 5304 in which the fabric sample is subjected to 50 rubs under tension of 5 p.s.i. and a load of 3 p.s.i. on an Oscillatory Cylinder (Wyzenbeek) Abrasion Tester using 10 lb. Oceanic duck as the abradant. Even after abrading the fabric, the brilliance of the color was not substantially diminished.

Samples of the coated fabric were tested according to Method 5512 both before and after being abraded as above. The samples were tested by measuring the p.s.i. pressure required to force water through the coated fabric. The maximum pressure which could be recorded on the test mechanism was 200 p.s.i. and the test samples both before and after abrasion withstood pressures in excess of 200 p.s.i.

To provide a comparison, a fabric was double coated with compositions similar to those above but employed the previously recommended three-component curing agent in place of the hexamethylenetetramine. The curing mixture was prepared by combining 100 grams of magnesium oxide, 12.5 grams of hydrogenated wood rosin, 5 grams of dipentamethylenethiuramtetrasulfide rubber accelerator and 182.5 grams of xylol. 2.39 grams of the above curing mixture were combined with 10.08 grams of a 40% chlorosulfonated polyethylene solution in xylol, 2.32 grams of titanium dioxide, and 3.01 grams of additional xylol. The resulting coating composition was applied to a sample of nylon fabric similar to that employed above and coated in the same manner. The coated fabric was cured under more severe conditions than those employed above to insure complete curing. The coated fabric was cured for 6 minutes at 163° C. (20 minutes at 110° C. as employed above is equivalent to 5 minutes at 150° C.).

After curing, the coated fabric was given a second coat with a mixture prepared by combining 8.05 grams of the above curing agent mixture, 33.92 grams of the 40% chlorosulfonated polyethylene solution in xylol, 10.10 grams of the above powdered daylight fluorescent pigment and 10.48 grams of additional xylol. The resulting coating composition was applied as a second coat to the coated fabric in a manner similar to the above and also cured for 6 minutes at 163° C. The color of the resulting coated fabric was much less brilliant and not very daylight fluorescent when compared with the fabric coated by the method of the present invention.

Samples of this double-coated fabric were subjected to the tests described above. The samples were found to withstand only 88.8 p.s.i. of water pressure before abrasion and just 3 p.s.i. of water pressure after abrasion indicating that very little of the coatings remained after abrasion.

Thus, whereas the fabric samples prepared according to the method of the present invention withstood in excess of 200 p.s.i. of water pressure both before and after abrasion, the samples prepared according to the methods known heretofore withstood less than half the water pressure before abrasion and substantially no pressure at all after abrasion.

Example II

The procedure of this example is the same as Example I except that the daylight fluorescent pigment employed was prepared in the following manner:

0.6 grams of 4 amino 1,8 naphthal p-xenylimide, 0.094 grams of meta diethylaminophenol-phthalein hydrochloride and 0.125 grams of ethyl ester of meta monoethylaminophenol-phthalein hydrochloride were dissolved in a 50% solution in xylol of butyl alcohol-modified urea-formaldehyde resin. The resulting solution was polymerized by heating at 90° C. until gelled, the gel cut into small pieces and cured at 140–145° C. until the dyed resin is polymerized to a glass-like hardness. The polymerized resin was then ground until the particles passed a 200-mesh screen. The resulting powdered pigment was a bright orange color.

Substitution of the above pigment in the hexamethylenetetramine fluorescent coating composition of Example I resulted in the production of coated fabrics of a brilliant daylight fluorescent orange color when the coating compositions contained hexamethylenetetramine as the curing agent. These coated fabrics were tested and found to exhibit superior physical properties substantially the same as the similarly coated fabrics of Example I. In contrast, fabrics coated with the compositions of Example I using the previously recommended curing agent of the prior art with the pigment prepared as above, were unsatisfactory in the same respect as were the similarly coated fabrics of Example I.

Example III 320 grams of chlorosulfonated polyethylene having an average molecular weight of about 20,000 (Hypalon 20) were combined with 480 grams of xylol and 180 grams of titanium dioxide. The combination was mixed and then given one pass on a 3-roll mill to insure uniformity. Also, 32 grams of hexamethylenetetramine were mixed with 96 grams of xylol in a ball mill and milled for about 18 to 20 hours to obtain a thorough dispersion. The two mixtures then were combined and passed over a 3-roll mill. The resulting coating composition was applied to a nylon fabric to obtain a white coated fabric.

The coated fabric when subjected to the tests of Example I showed satisfactory abrasion resistance, coating adhesion and other physical properties similar to the fabric of Example I coated with the compositions of the present invention.

480 grams of a daylight fluorescent pigment may be substituted for the 180 grams of titanium dioxide to achieve brilliant daylight fluorescent colors without any significant reduction in the abrasion resistance of the fabric.

Example IV

A white paint suitable for application by brushing or spraying was prepared by thoroughly mixing 80 grams of chlorosulfonated polyethylene, 320 grams of xylol and 45 grams of titanium dioxide. A curing solution for the paint was prepared by mixing 16 grams of a 60% solids solution of a non-oxidizing coconut oil phthalic alkyd resin (Duraplex ND78), 8 grams of xylol and 8 grams of hexamethylenetetramine. The curing solution was mixed into the paint shortly before the application thereof.

This paint was used to paint white side walls on black rubber tires. The paint had good covering ability and excellent adhesion to the rubber with little, if any, bleeding from the black rubber being coated into the white coating. Coatings formed from this paint were particularly successful when the tires contained large amounts of reclaimed rubber.

Paints for other purposes can be prepared in a similar manner by the use of other fluorescent and non-fluorescent pigments in place of the titanium dioxide.

The foregoing examples illustrate in detail the preparation of coating compositions containing orange daylight fluorescent colors and titanium dioxide, however, a wide variety of other fluorescent and non-fluorescent pigments may be employed in preparing the coating compositions of the present invention. The orange daylight fluorescent pigments were chosen for the examples since the orange pigments are known to be extremely sensitive and thus, provide a more critical test than do some of the other pigments.

It should be apparent from the nature of this invention that chlorosulfonated polyethylene cured according to the method of the present invention can be used in substantially any process in which this synthetic rubber has been used previously with the curing agents known heretofore. Also, the chlorosulfonated polyethylene of the present invention will be useful in many new applications due to the substantially faster rate of curing and the superior physical properties of the coating. For example, in addition to the coating compositions of the examples which were applied by smearing, brushing or spraying, the curing process of the present invention should be useful in calendar coating, molding, extrusion and other processes in which chlorosulfonated polyethylene may be employed.

From the foregoing description of the invention, it is apparent that various modifications may be made by those skilled in the art without departing from the scope of the invention as defined in the following claims.

What is claimed is:

1. A composition comprising a curable mixture consisting essentially of chlorosulfonated polyethylene and hexamethylenetetramine as a curing agent dispersed therein.

2. A composition comprising a curable mixture consisting essentially of chlorosulfonated polyethylene, hexamethylenetetramine as a curing agent, and a solvent for said polyethylene, said hexamethylenetetramine comprising less than about 10% by weight of said polyethylene.

3. A coating composition comprising a pigment dispersed in a curable mixture consisting essentially of chlorosulfonated polyethylene and hexamethylenetetramine as a curing agent.

4. A coating composition comprising a pigment dispersed in a curable mixture consisting essentially of chlorosulfonated polyethylene, hexamethylentetramine as a curing agent and a solvent for said polyethylene.

5. A coating composition comprising a daylight fluorescent pigment dispersed in a curable mixture consisting essentially of chlorosulfonated polyethylene, hexa- 2,963,382

8

...nt and an aromatic

...nized coating comprising... ...nent in a mixture com... ...hylene and hexamethyl- ...enetetramine... ...of the resulting dispersion ...said coating.

...ming a vulcanized coating comprising... dispersing a pigment in a mixture com...

daylight fluorescent pigment in a mixture comprising chlorosulfonated polyethylene, hexamethylenetetramine as a curing agent, and a solvent for said polyethylene, forming a second coating of the resulting dispersion on the surface of said first coating and heating said second coating to an elevated temperature to effect a curing of said second coating.

12. A vulcanized elastomer comprising the reaction product of a mixture consisting essentially of chlorosulfonated polyethylene and hexamethylenetetramine as

UNITED STATES PATENT OFFICE
CERTIFICATE OF CORRECTION

Patent No. 2,963,382  December 6, 1960

Joseph L. Switzer

It is hereby certified that error appears in the above numbered patent requiring correction and that the said Letters Patent should read as corrected below.

Column 2, lines 63 to 67, the structural formula should appear as shown below instead of as in the patent:

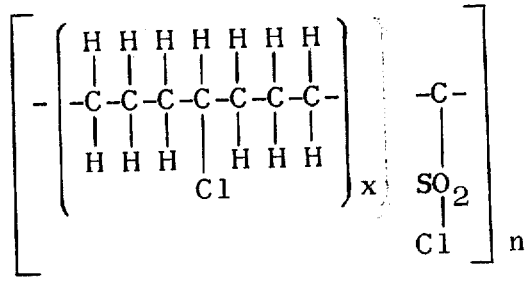

Signed and sealed this 31st day of July 1962.

(SEAL)
Attest:
ERNEST W. SWIDER
Attesting Officer

DAVID L. LADD
Commissioner of Patents